United States Patent [19]

Broodman

[11] 4,066,861
[45] Jan. 3, 1978

[54] METHOD OF WELDING A PIPE TO A PIPE PLATE

[75] Inventor: Johannus Jacobus Broodman, Breskens, Netherlands

[73] Assignee: B.V. Koninklijke Maatschappij "De Schelde", Netherlands

[21] Appl. No.: 650,187

[22] Filed: Jan. 19, 1976

[30] Foreign Application Priority Data

Jan. 23, 1975  Netherlands ............... 7500814

[51] Int. Cl.² ............................................. B23K 31/00
[52] U.S. Cl. .................................. 219/61; 219/137 R
[58] Field of Search ................ 219/60 A, 61, 125 R, 219/137 R

[56] References Cited

U.S. PATENT DOCUMENTS

| | | | |
|---|---|---|---|
| 2,050,339 | 8/1936 | Kidd | 219/137 R |
| 2,310,158 | 2/1943 | Austin | 219/61 |
| 2,996,600 | 8/1961 | Gardner, Jr. et al. | 219/61 |
| 3,205,340 | 9/1965 | Gotch | 219/137 R |
| 3,350,537 | 10/1967 | Lawrence et al. | 219/125 R |
| 3,440,391 | 4/1969 | Apblett | 219/137 R |
| 3,629,539 | 12/1971 | Roberts | 219/60 A |
| 3,643,059 | 2/1972 | Hill et al. | 219/61 |
| 3,670,140 | 6/1972 | Roberts | 219/137 R |
| 3,769,489 | 10/1973 | Charlesworth | 219/60 A |
| 3,880,340 | 4/1975 | Takeuchi et al. | 219/60 A |

FOREIGN PATENT DOCUMENTS

| | | | |
|---|---|---|---|
| 777,355 | 1/1968 | Canada | 219/137 R |
| 1,151,414 | 5/1969 | United Kingdom | 219/137 R |
| 1,054,666 | 1/1967 | United Kingdom | 219/137 R |

*Primary Examiner*—J. V. Truhe
*Assistant Examiner*—Clifford C. Shaw
*Attorney, Agent, or Firm*—Bucknam and Archer

[57] ABSTRACT

A method of welding a pipe to a pipe plate conprises slipping a ring over the pipe, the adjoining surfaces of the ring being in contact with the pipe surface and with the pipe plate surface over the entire circumference, inserting the pipe end over a short distance into a bore in the pipe plate, rolling the end of the pipe against the bore wall whereby a clamping contact between the pipe end and the bore wall is achieved and welding the pipe end to the pipe plate with the aid of a nonconsumable electrode under conditions that only a portion of the cross section of the ring melts. It is preferable, after welding the end of the pipe within the interior of the bore to melt completely the ring and to achieve a second weld joint. In this last step, one or more circular welds between the pipe end and the inner surface of the bore are made.

7 Claims, 4 Drawing Figures

METHOD OF WELDING A PIPE TO A PIPE PLATE

The invention relates to a method of welding a pipe to a pipe plate, in which first one of the pipe-ends is inserted over a short distance, for instance a few millimeters, in a matching bore in the pipe plate and thereafter this pipe-end is welded to the pipe plate within the bore, with the aid of a non-consumable electrode, making one or more circular welds between the pipe-end and the inner surface of the bore.

By this welding method a weld joint between the pipe-end and the pipe plate is obtained, which as the metal portion melts by the electric arc, completely extends through the pipe and the adjoining portions of the pipe plate, as shown in the accompanying FIG. 1 of the drawings. The solidification process starts from the pipe-end and the pipe plate surface to the interior of the weld, which may result in film-like, low solidifying segregations, completely extending through the joint from the interior to the exterior of the pipe-end bore. Such failures cannot be detected and may result in breaking or rupture of the joint during the welding process or operation of the workpiece so obtained. Pipe-pipe plate joints, fabricated by the above welding method are generally used in heat exchangers. The above joints are insufficiently safe for such heat exchangers, as steam generators, in which liquid sodium flows through a housing surrounding the pipes, and in which steam or water flows through the interior of the pipes. In case liquid sodium comes in contact with the steam, a water-sodium reaction of explosive nature can be the result, which seriously may damage the heat exchanger.

It is therefore an object of this invention to provide a method as stated above, in which the above-mentioned disadvantages can be avoided, which method can be used safely for building sodium-steam heat exchangers.

According to the present invention a suitable ring is slipped over the pipe, which ring upon welding, abuts against the pipe plate wall adjoining the bore, and upon welding the pipe-end to the plate so much heat is supplied, that a portion only of the cross section of the ring melts.

Upon using such a ring, the non-molten material of the ring serves as a support for the molten material. Moreover the solidification process not only starts from the interior of the pipe and pipe plate, but also from the partly molten ring. This results in a bent, continuous solidification front, extending from the pipe plate through the ring until within the pipe interior, which solidification front moves to the interior of the pipe and creates a completely deviating solidification, avoiding inclusions of segregations and hereby avoiding cracks or ruptures of the joint.

A disadvantage of this method, which is of less inportance, is that within the pipe, directly adjoining the weld, a zone of low quality structure is formed, extending across the pipe wall, which zone under heavy load, likewise may end in a rupture or cracks.

This can be avoided by a preferred method of the present invention, which is characterized in that first the end of the pipe within the bore is welded to the bore interior, and that thereafter one or more circular welds are made at the outside, where the pipe has been inserted in the bore, the method being such that the ring is melted completely and constitutes a second weld joint.

After solidification of the weld, the said zone no longer extends across the pipe wall, between the exterior and the interior of the pipe, but with an acute angle, so that the zone is less liable to ruptures or cracks. Moreover upon remelting the ring, the structure of the first weld will be substantially improved. The above method offers a maximum guarantee to cracks and ruptures of the pipe. This is proved by a lower rejection percentage, which is much lower even than upon applying the above cited known method.

Preferably the ring has a cross section of a right-angled triangle, in which the right-angled sides are adjoining the pipe and the pipe plate respectively. This gives a particularly smooth transition of the pipe to the pipe plate.

Preferably the material of the ring corresponds with that of the pipe and/or the pipe plate.

The above cited problems have been ascertained in particular by steam generators made of 10CrMoNiNb 910, so that the present invention is particularly suitable for building such generators, in which case the same material is used for the rings.

However, it is not absolutely necessary to use for the ring material the same material of the pipe or pipe plates, so that also material can be used improving the alloy of the joint.

The use of rings for welding a pipe to a pipe plate is known per se. However, in these known methods these rings always are completely melted-through from the interior, because by the narrow arrangement of the pipes no exterior weld can be laid. Exterior welds can be made however by using a particular weld load, so that the use of such rings now is of particular advantage. The above segregation failures cannot be avoided by the knowm method, because the rings are melted completely in the first circumferential welding operation.

The invention will now be described by way of example, with reference to the accompanying drawings.

Figure 1:
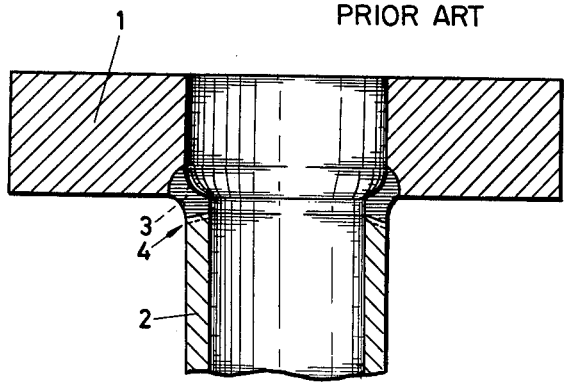
FIG. 1 shows a cross section of a weld obtained by the known method, stated above.

In FIG. 1 the partly shown pipe plate 1 is welded to the partly shown pipe 2. The pipe and pipe plate material is completely welded-through, the joint extending from the interior to the exterior as shown by the shaded portions. Upon solidification two separate solidification fronts are formed, as remarked above, the one front of which starts in the melt adjoining the pipe and the other in the melt adjoining the pipe plate. These solidification fronts move towards each other, so that the core or intermediate portion of the joint solidifies last. Because some substances show the property to remain in a melt, the last portions of the melt may be of lower quality because of film-like segregations, formed by the above substances, which sometimes completely extend through the solidified joint and weaken the joint because of the deviating material properties, relative to the adjoining joint material. One of such segregations is shown by the interrupted line and referred to by the reference number 3. Also shrink cracks may appear where the melt solidifies last, which cracks are directed to the interior of the joint. Another disadvantage, stated above, is formed by the weaker zone 4 in the pipe, directly adjoining the solidified joint, which zone also extends across the pipe and may lead to pipe rupture upon heavy mechanical and thermic loads of a heat exchanger.

Figure 2:
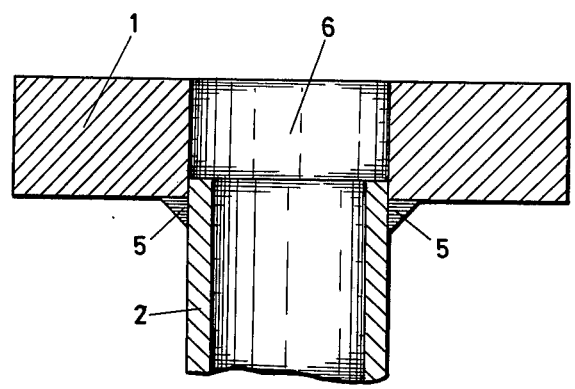
FIG. 2 shows a welding arrangement of the pipe, the ring and the pipe plate for the welding process of the present invention.

FIG. 2 shows the welding arrangement for the present invention, showing the pipe 2, pipe plate 1 and ring 5, prior to the welding operation. The pipe 1 slidingly fits in the bore 6, and the ring 5 closely fits around the pipe 1. For a good weld joint it is necessary that the adjoining surfaces of the ring 5 are in contact with the pipe surface and the pipe plate surface over the whole circumference. After slipping the ring 5 over the pipe 2 the end of the pipe is inserted in the bore 6. Thereafter this end is mechanically rolled against the bore wall, which results in a good clamping contact between the pipe-end and the bore wall. Also upon rolling, the pipe 2 is drawn against the plate, which results in a good contact without or with a particularly narrow slot only between the ring and plate.

For forming the first weld layer a welding torch comprising a non-consumable electrode is brought into the bore. Generally one circular passage of the torch along the pipe-end will be sufficient to melt this end, a portion of the adjoining bore wall and an adjoining portion of the ring 5.

Figure 3:
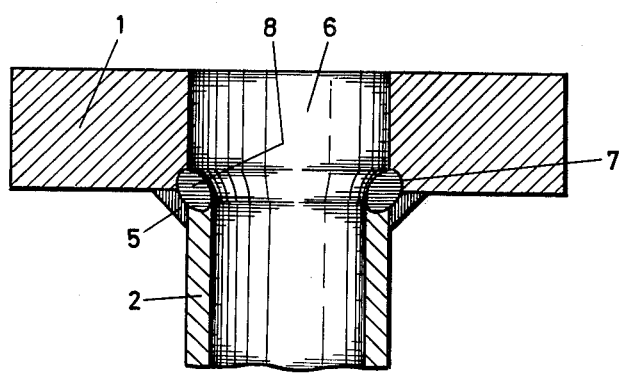
FIG. 3 shows a cross section of a pipe and pipe plate and the joint obtained by the welding method of the present invention.

FIG. 3 shows the joint after the first weld phase. As is shown, the ring 5 has not been melted completely, so that segregations cannot pass completely through the joint anymore. The still existing segregations are of such shape and position, that they are no longer dangerous. This is a result of a curved, uninterrupted solidification front, shown in FIG. 3 by the reference number 7 and starting from the portion of the melt adjoining the pipe plate 1, the ring 5 and the pipe 2, and moving to the interior of the bore and pipe. Also in this first phase the non-melted portion of the ring forms a good support for the melt.

Figure 4:
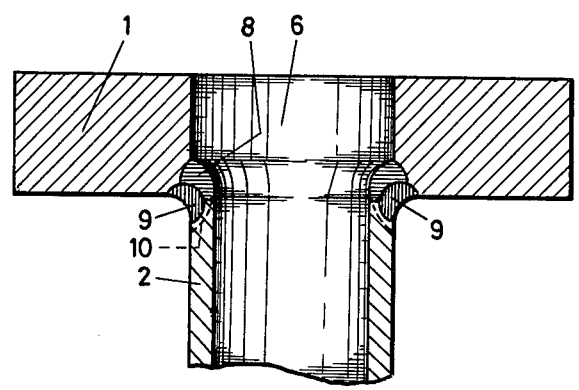
FIG. 4 shows a cross section of the pipe and pipe plate as well as the joint obtained by the preferred welding method of the present invention.

FIG. 4 shows the end phase for the preferred welding method, in which also the ring 5 has been completely melted by means of a non-consumable electrode, passing around the exterior of the pipe. FIG. 4 shows two weld layers 8 and 9. Layer 9 will strengthen the joint, because the joint now is of a greater cross section, but also by the recrystallization of the first layer 8, by heat supply from the layer 9 to the first layer 8. Possible segregations in layer 9 cannot penetrate in layer 8 and therefore, as in the case of layer 8, no longer will be dangerous and lead to ruptures and cracks. The interrupted lines, referred to by reference number 10 show the zone corresponding to zone 4 in FIG. 1. This zone 10 forms a much more acute angle with the wall of the pipe through the wall, than zone 4 in FIG. 1 and therefore is of greater length. This gives a much stronger joint which can withstand greater mechanical and thermic loads. As a matter of course a similar zone will be formed in the pipe plate 1, but here there is no detrimental effect.

The method of the present invention has been used for welding pipes with a diameter of 17.2 mm and a wall thickness of 2.95 mm to pipe plates.

Although the invention has been described with reference to a specific embodiment, many variations will be apparent to those skilled in the art, without departing from the scope of the invention as described in the following claims.

I claim:

1. Method of welding a pipe to a pipe plate comprising the steps of:
   inserting one of the pipe ends over a short distance in a bore in the pipe plate, the bore being in alignment with the pipe;
   sliding a ring over said pipe to such a point that it abuts against the pipe plate wall adjacent said bore;
   internal bore welding said pipe end to said plate by means of a non-consumable electrode positioned within said bore, and supplying so much welding heat that a portion only of the ring melts whereby the non-molten material of the ring serves as a support for the molten material.

2. Method as claimed in claim 1, wherein the pipe closely fits in the bore and the ring closely fits around the pipe and after inserting the pipe-end in the bore, the pipe end is rolled and drawn to the pipe plate, a narrow clamping fitting of the pipe in the bore and around the pipe and a close fitting between the ring and the pipe plate are obtained.

3. Method as claimed in claim 1 wherein the ring is of a right-angled triangle cross section, the right-angled sides of which being in contact with the pipe and pipe plate respectively.

4. Method as claimed in claim 1 wherein the material of the ring is the same as the material of at least one of the pipe and the pipe plate.

5. Method as claimed in claim 1 for welding pipes to a pipe plate of a steam generator serving as heat exchanger, consisting of 10CrMoNiNb 910, wherein the material of the ring likewise consists of 10CrMoNiNb 910.

6. Method as claimed in claim 1 wherein the ring material is made of an alloy other than the alloy of the pipe and the alloy of the pipe plate.

7. Method as claimed in claim 1, wherein first the end of the pipe within the bore is welded to the bore interior and thereafter one or more circular welds are made in the exterior of the pipe, where the pipe has been inserted in the bore by means of a non-consumable electrode passing around the pipe, whereby the ring is melted completely and constitutes a second weld joint.

* * * * *